(12) United States Patent
Segev et al.

(10) Patent No.: US 11,537,193 B2
(45) Date of Patent: *Dec. 27, 2022

(54) SHAPED AND OPTIMIZED POWER CYCLES

(71) Applicant: Western Digital Technologies, Inc., San Jose, CA (US)

(72) Inventors: Amir Segev, Meiter (IL); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/465,423

(22) Filed: Sep. 2, 2021

(65) Prior Publication Data
US 2021/0397242 A1 Dec. 23, 2021

Related U.S. Application Data

(63) Continuation of application No. 16/883,897, filed on May 26, 2020, now Pat. No. 11,126,254.

(51) Int. Cl.
*G06F 1/00* (2006.01)
*G06F 1/3287* (2019.01)

(52) U.S. Cl.
CPC .................................. *G06F 1/3287* (2013.01)

(58) Field of Classification Search
None
See application file for complete search history.

(56) References Cited

U.S. PATENT DOCUMENTS

| | | |
|---|---|---|
| 2014/0032939 A1 | 1/2014 | Jeddeloh |
| 2015/0033057 A1 | 1/2015 | Maroney et al. |
| 2017/0024002 A1 | 1/2017 | Tzafrir et al. |
| 2017/0084344 A1 | 3/2017 | Choi et al. |
| 2019/0129630 A1 | 5/2019 | Erez et al. |
| 2020/0233474 A1 | 7/2020 | Alcorn et al. |

OTHER PUBLICATIONS

International Search Report and the Written Opinion for International Application No. PCT/US2020/065709 dated Apr. 8, 2021, 11 pages.

*Primary Examiner* — Nitin C Patel
(74) *Attorney, Agent, or Firm* — Patterson & Sheridan, LLP; Steven H. VerSteeg

(57) ABSTRACT

Systems and methods, according to the present disclosure, determines a duration of the current queue of commands in the controller, executes all full commands capable of being executed prior to the beginning of a low power cycle. Commands that are not executed may be re-fetched when the device enters a power mode. In an alternate embodiment, a portion of a command that is executable prior to the beginning of a low power cycle is executed, with the un-executed portion of the command being stored on the device, in an "always on" or AON memory. This un-executed portion is fetched and executed when the device enters the power mode.

19 Claims, 9 Drawing Sheets

SHAPED AND OPTIMIZED POWER CYCLES

CROSS-REFERENCE TO RELATED APPLICATIONS

This application is a continuation of U.S. patent application Ser. No. 16/883,897, filed May 26, 2020, now U.S. Pat. No. 11,126,254, which is herein incorporated by reference.

BACKGROUND OF THE DISCLOSURE

Field of the Disclosure

Embodiments of the disclosure generally relate to power management in a computer device, and more specifically to optimizing power duty cycle management in a computing device.

Description of the Related Art

In the field of computing device power management, and particularly for mobile device power management, smaller devices with more component complexity require more optimized power management to preserve battery power, reduce heat, and optimally use resources. For these devices, it can be beneficial to power down components (e.g., storage devices such as SSD's, and other PCIe devices) not in use, or for components that may be in use, power these components on a power duty cycle.

In prior approaches, power management for components would provide full power (i.e., a power mode) to a component for a defined period of time, and put the component into a low power, or "deep sleep", mode for a defined period of time. In these approaches, in order to prepare for low power mode, all commands in a command queue of a controller would be required to complete, during which no additional commands are processed or received. Once all commands are complete, the component enters the low power mode. This delay in processing all remaining commands shortens the time the component may be in low power mode, as the component is in power mode in order to execute the remaining commands.

Upon transitioning to the power mode from low power mode, there would be no commands in the controller, requiring the controller to fetch the next command from a host or other device. This delay in execution of any commands causes latency in the component while its resources are dormant (that is, not executing a command), wasting those resources while they sit idle.

What is needed are systems and methods that would optimize the execution of pending commands to enable faster entry to a lower power mode, and the ability to usefully utilize component resources immediately upon entry to a power mode.

SUMMARY OF THE DISCLOSURE

The present disclosure generally relates to systems and methods for power cycle optimization. Disclosed embodiments determine a duration of the current queue of commands in the controller, executes all full commands capable of being executed prior to the beginning of a low power cycle. Commands that are not executed may be re-fetched when the device enters a power mode. In an alternate embodiments, a portion of a command that is executable prior to the beginning of a low power cycle is executed, with the un-executed portion of the command being stored on the device, in an "always on" or AON memory. This unexecuted portion is fetched and executed when the device enters the power mode.

In one embodiment, a data storage device includes one or more memory devices and a controller coupled to the one or more memory devices. The controller is configured to receive a plurality of commands at the data storage device that includes a power down time, from a host. The controller is also configured to calculate an expected execution duration of each one of the plurality of commands, select a command from the plurality of commands having a duration that will not exceed the power down time, execute the command, and cause to enter, by the data storage device, a power down state at the power down time.

In another embodiment, a data storage device includes one or more memory devices and a controller coupled to the one or more memory devices. The controller is configured to receive a plurality of commands at a device comprising a power down time and a power up time, from a host. The controller is also configured to calculate an expected execution duration of each one of the plurality of commands, select a command from the plurality of commands having a duration that will exceed the power down time of the device, execute a portion of the command that can be executed prior to the power down time, and enter, by the device, a power down state at the power down time.

In another embodiment, a system for controlling power consumption of a device is disclosed, the system including a means for receiving a command at a device, from a host, a means for calculating the duration of the command, and a means for determining a power down time of the device. The system further includes a means for selecting the command, a means for determining if the duration of the command will exceed the power down time, and a means for executing the command. The system may further include a means for updating the power down time of the device, based on the duration of the command, and a means for putting the device in a power down state based on the power down time.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Systems and methods according to the present disclosure determines a duration of the current queue of commands in the controller, executes all full commands capable of being executed prior to the beginning of a low power cycle. Commands that are not executed may be re-fetched when the device enters a power mode. In an alternate embodiments, a portion of a command that is executable prior to the beginning of a low power cycle is executed, with the un-executed portion of the command being stored on the device, in an "always on" or AON memory. This un-executed portion is fetched and executed when the device enters the power mode. In some embodiments, completely un-executed commands may be stored on the AON memory.

Figure 1:
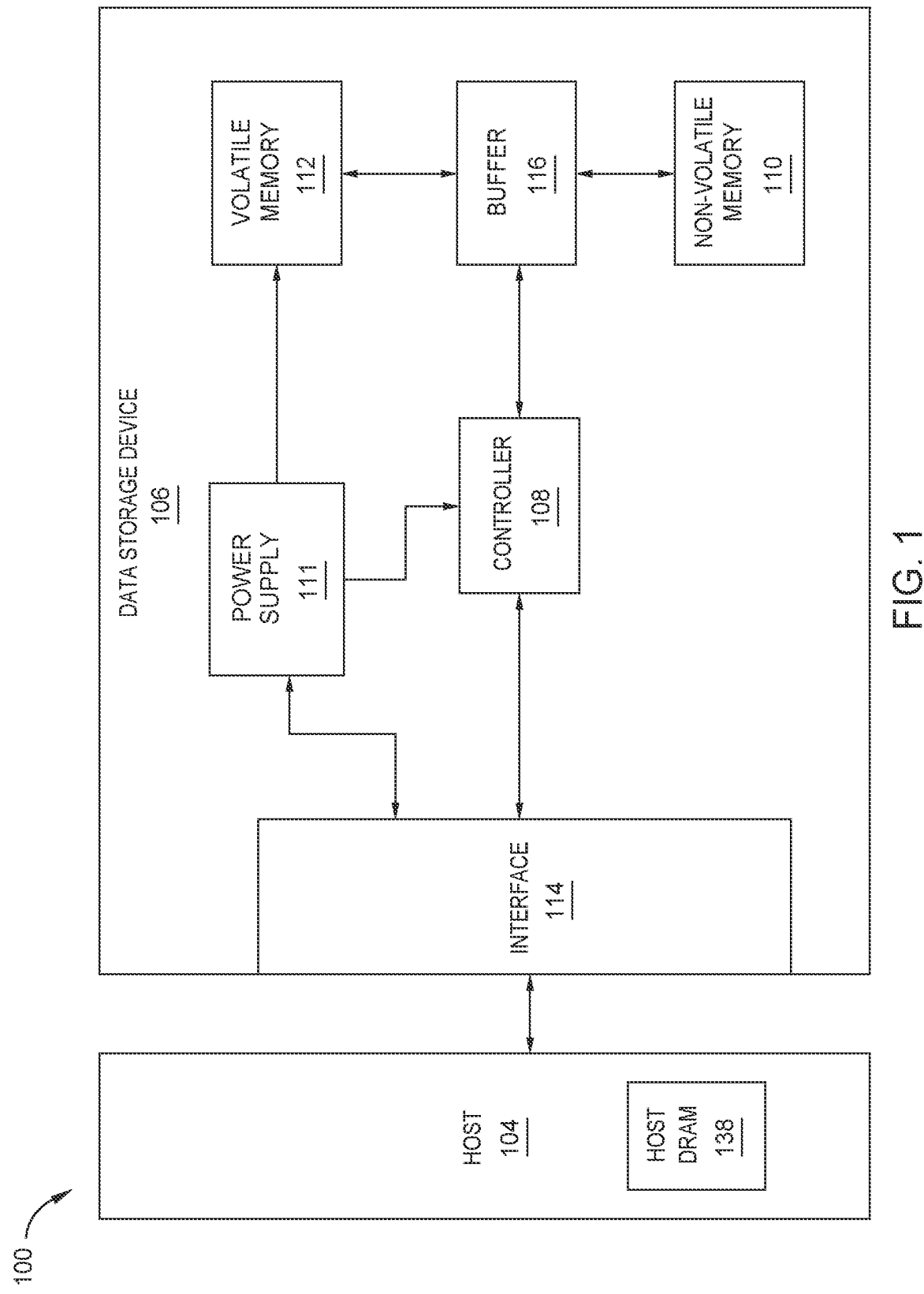
FIG. 1 is a schematic illustration of a computing system including a host device and a storage device, according to disclosed embodiments.

FIG. 1 is a schematic block diagram illustrating a storage system 100 in which data storage device 106 may function as a storage device for a host device 104, in accordance with one or more techniques of this disclosure. For instance, the host device 104 may utilize non-volatile memory devices 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The data storage device 106 includes a controller 108, non-volatile memory (NVM) 110, a power supply 111, volatile memory 112, an interface 114, and a buffer 116. The controller 108 comprises an internal memory or buffer 116. In some examples, the data storage device 106 may include additional components not shown in FIG. 1 for sake of clarity. For example, the data storage device 106 may include a printed board (PB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like.

The electrical connection of the interface 114 (e.g., the data bus, the control bus, or both) is electrically connected to the controller 108, providing electrical connection between the host device 104 and the controller 108, allowing data to be exchanged between the host device 104 and the controller 108. The interface 114 may be a type of connection unit to transfer data to the data storage device 106 from the host device 104, and vice-versa. Such connection units may be a USB-A connection, a USB-B connection, a mini USB-A connection, a mini USB-B connection, a micro USB-A connection, a micro USB-B connection, a USB-C connection, or a lightning connection. The connection unit may comprise of several pins with a specialized usage. Furthermore, connection units are utilized for various purposes such as isochronous transfers, interrupt transfers, and bulk transfers. The term "bulk transfers" refers to large sporadic transfers using all remaining available bandwidth, but with no guarantees on bandwidth or latency. Bulk transfers are utilized when transferring files or data through a connection medium such as a USB cable. However, other methods of transferring data are available and the use of the term "USB cable" is not intended to be limiting.

For example, a USB-A connection has 4 pins. Each pin is utilized for a specific purpose, such as a supply voltage pin, a data (−) pin, a data (+) pin, and a supply voltage ground pin. Other connection units may have more than or less than 4 pins and each pin may have a different usage. In some examples, the electrical connection of the interface 114 may also permit the data storage device 106 to receive power from the host device 104. For example, as illustrated in FIG. 1, the power supply 111 may receive power from the host device 104 via the interface 114.

The data storage device 106 includes NVM 110, which may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. Flash memory devices may include NAND or NOR based flash memory devices, and may store data based on a charge contained in a floating gate of a transistor for each flash memory cell. In NAND flash memory devices, the flash memory device may be divided into a plurality of blocks which may be divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), or quad level cell (QLC). The controller 108 may write data to and read data from NAND flash memory devices at the page level and erase data from NAND flash memory devices at the block level.

The data storage device 106 includes a power supply 111, which may provide power to one or more components of the data storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory before sending the data to the NVM 110.

Figure 2:
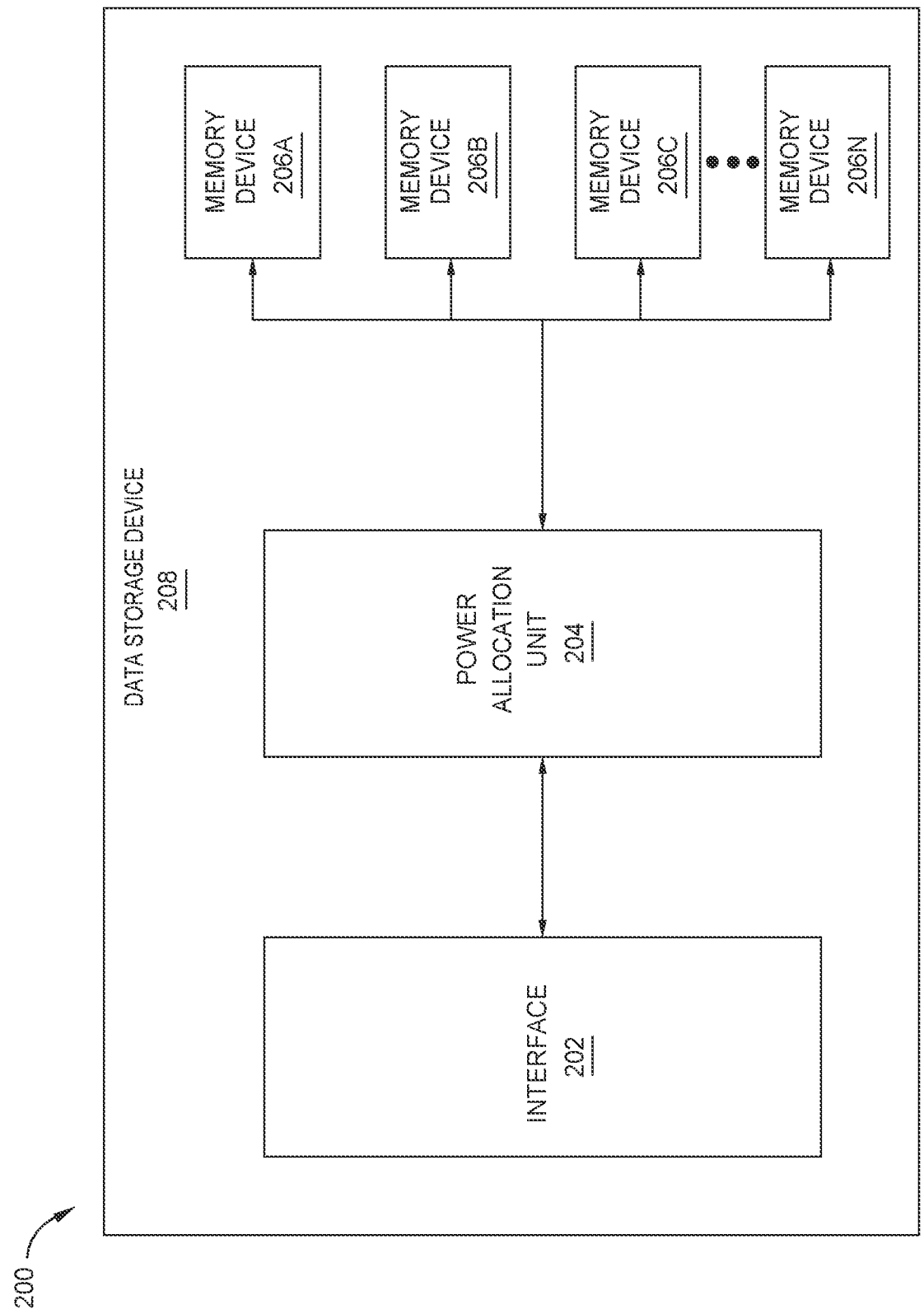
FIG. 2 is a schematic illustration of a data storage device, according to disclosed embodiments.

FIG. 2 is a schematic illustration of a data storage device 208, according to one embodiment. Data storage device 208 comprises an interface 202 and a power allocation unit (PAU) 204. The interface 202 may be the interface 114 of FIG. 1. The data storage device 208 further comprises an array of memory devices 206A-206N (collectively referred to as memory devices 206). The notation "N" refers to the last memory device of a plurality of memory devices. Furthermore, the memory devices 206 may be the non-volatile memory 110 of FIG. 1 or an NVMe storage device. Each of the memory devices 206A-206N may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.). However, the listed data storage size of the memory devices is not intended to be limiting nor restricting. Furthermore, in one embodiment, memory devices 206A-206N are the same type and have the same data storage sizes. In another embodiment, memory devices 206A-206N are different types but have the same data storage sizes. In yet another embodiment, memory devices 206A-206N are different types and have different data storage sizes.

The power allocation unit 204 may be coupled with a controller (not shown), such as the controller 108 of FIG. 1. The PAU 204 appropriates power received from the host device, such as the host device 104 of FIG. 1, to each of the memory devices 206. The controller 108 may determine the appropriate power state of each memory device 206A-206N, and the PAU 204 provides the corresponding power to each memory device 206A-206N.

The host device 104 may provide a suitable amount of power to the data storage device 208 through one or more pins on the interface 202. The suitable amount of power may be more than or equal to the amount of power the data storage device 208 requires to operate. For example, the power a data storage device 208 may receive from the host device 104 may be about 5 W. Furthermore, a data storage device 208 may draw out about 500 mW to about 15 W of power from the host device 104. The previously mentioned values for power are not intended to be limiting, but to provide a reference.

A memory device 206A-206N may have several power states (PS). For example, a memory device 206A-206N may have the following 5 power states: PS0, PS1, PS2, PS3, and PS4. Each of the power states are associated with a distinct data storage device 208 operation. Power states PS0, PS1, and PS2 are considered operational power states, utilizing about 1 W to about 8 W of power, whereas power states PS3 and PS4 are considered non-operational power states, utilizing about 2 mW to about 50 mW of power. An operational power state refers to the ability of a host device, such as the host device 104 of FIG. 1, to communicate with a memory device 206A-206N of a data storage device 208.

Power states are numbered sequentially, where higher numbers represent lower power requirements and corresponding higher exit latencies. Furthermore, each power state has an associated power requirement and an exit latency. PS0 may require 4.5 W with the lowest exit latency. PS1 may require less power than PS0, such as 3 W, and may have an exit latency equal to or higher than the exit latency of PS0. PS2 may require less power than PS1 and may have an exit latency equal to or higher than the exit latency of PS1. PS3 may require less power than PS2 and may have an exit latency equal to or higher than the exit latency of PS2. PS4 may require less power than PS3, such as 5 mW, and may have an exit latency equal to or higher than the exit latency of PS3, such as 50 mW. The values for the power states and exit latencies are not intended to be limiting, but to provide an example of possible embodiments.

PS0 is referred to as a full operational state, where I/O commands are enabled and the device may generate interrupts. Interrupts are an automatic transfer of firmware execution due to a system timer or a user command. Furthermore, power states PS1, PS2, PS3, and PS4 are considered low power states. Power states PS1 and PS2 are also operational states, however, PS1 and PS2 may have a lower functionality than that of PS0. Power states PS3 and PS4 are non-operational states have a power requirement less than that of the operational power states. Furthermore, memory devices 206 not used are placed in a non-operational power state PS4 to limit the idle power consumption to a minimal value.

In order for I/O commands to occur, the memory device 206A-206N is woken up and placed into power state PS0. The controller, such as the controller 108 of FIG. 1, utilizes the PAU 204 to change the power state of a memory device 206A-206N from PS0 to either PS1, PS2, or PS3 dependent on the situation. However, in order for a memory device 206A-206N to be placed into PS4, the memory device 206A-206N will need to be in power state PS3. However, the controller 108 is able to utilize the PAU 204 to allocate the appropriate amount of power to place all power states PS1, PS2, PS3, and PS4 into power state PS0 when a full operational state is required.

Figure 3:
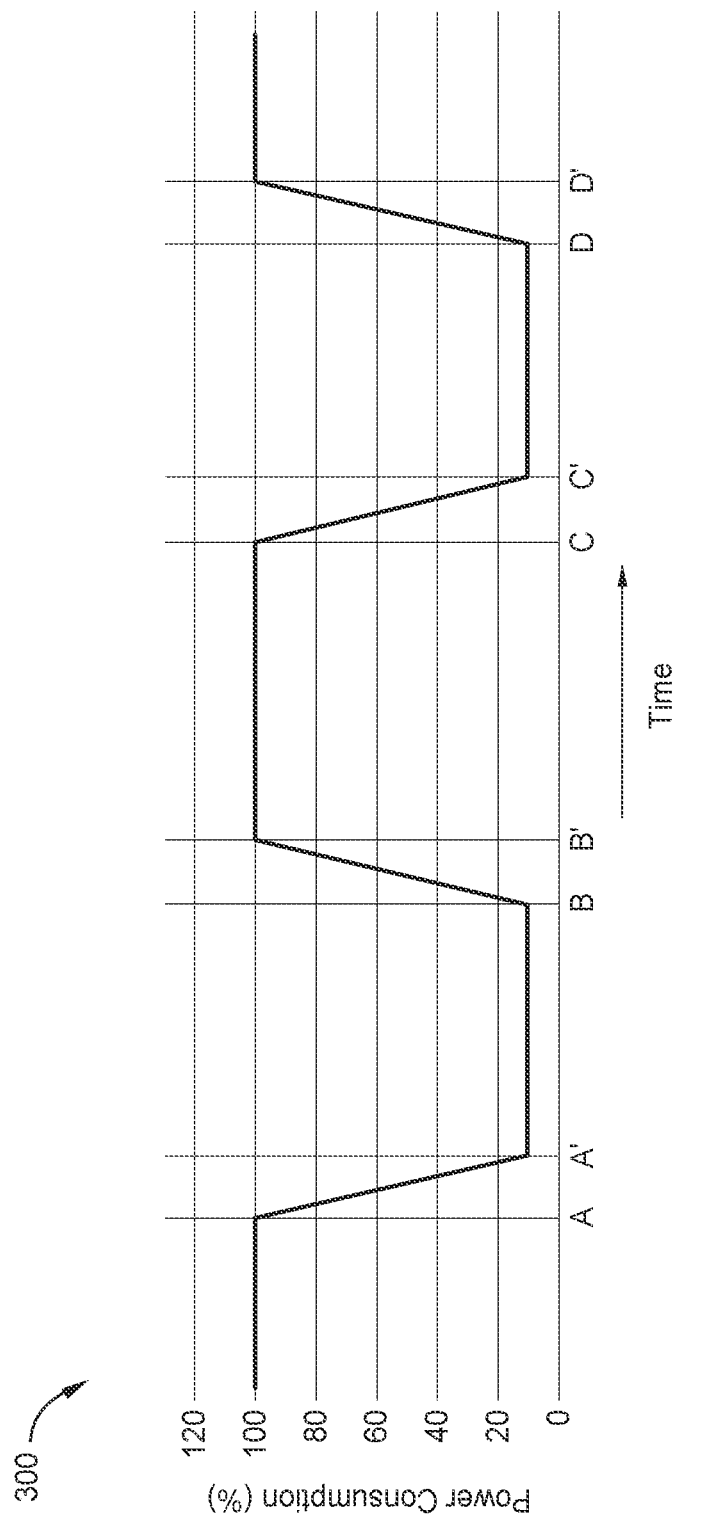
FIG. 3 is an example diagram of a power duty cycle, according to disclosed embodiments.

FIG. 3 is an example diagram of a power duty cycle, according to disclosed embodiments. A storage device, such as the storage device 208 of FIG. 2, may undergo the power duty cycle during certain operations. Time is graphed on the x-axis and the power consumption percent is graphed on the y-axis. The power state PS1 may correspond with a power consumption of about 100% and the power state PS4 may correspond with a power consumption of about 10%. The deep sleep mode may refer to the power state PS4. The about 10% power consumption utilized by the storage device during the deep sleep mode allows the storage device to have a fast recovery into a full power mode (e.g., wake up), such as PS0, without having to go through the boot-up sequence. The term "wake up" may be utilized in any tense to describe a storage device returning to a full power mode from a deep sleep mode. The part of the controller, such as the controller 108 of FIG. 1, which is responsible for the fast recovery into the full power mode from a deep sleep mode is the Always-On (AON) module. When the storage device is in the deep sleep mode, the AON module is powered fully.

The boot-up sequence may be an operation from when the storage device is turned off (e.g., no power is provided) to a point in which the storage device is in an operational power state. The boot-up sequence may take more time to achieve an operational power state than waking up from the deep sleep mode. The power duty cycle mode may utilize about 100% power consumption about 50% of the time, such as 100 msec, and about 10% power consumption about 50% of the time, such as 100 msec. The power duty cycle mode may be more energy efficient than working continuously in half power mode in terms of total power consumption.

Figure 4:
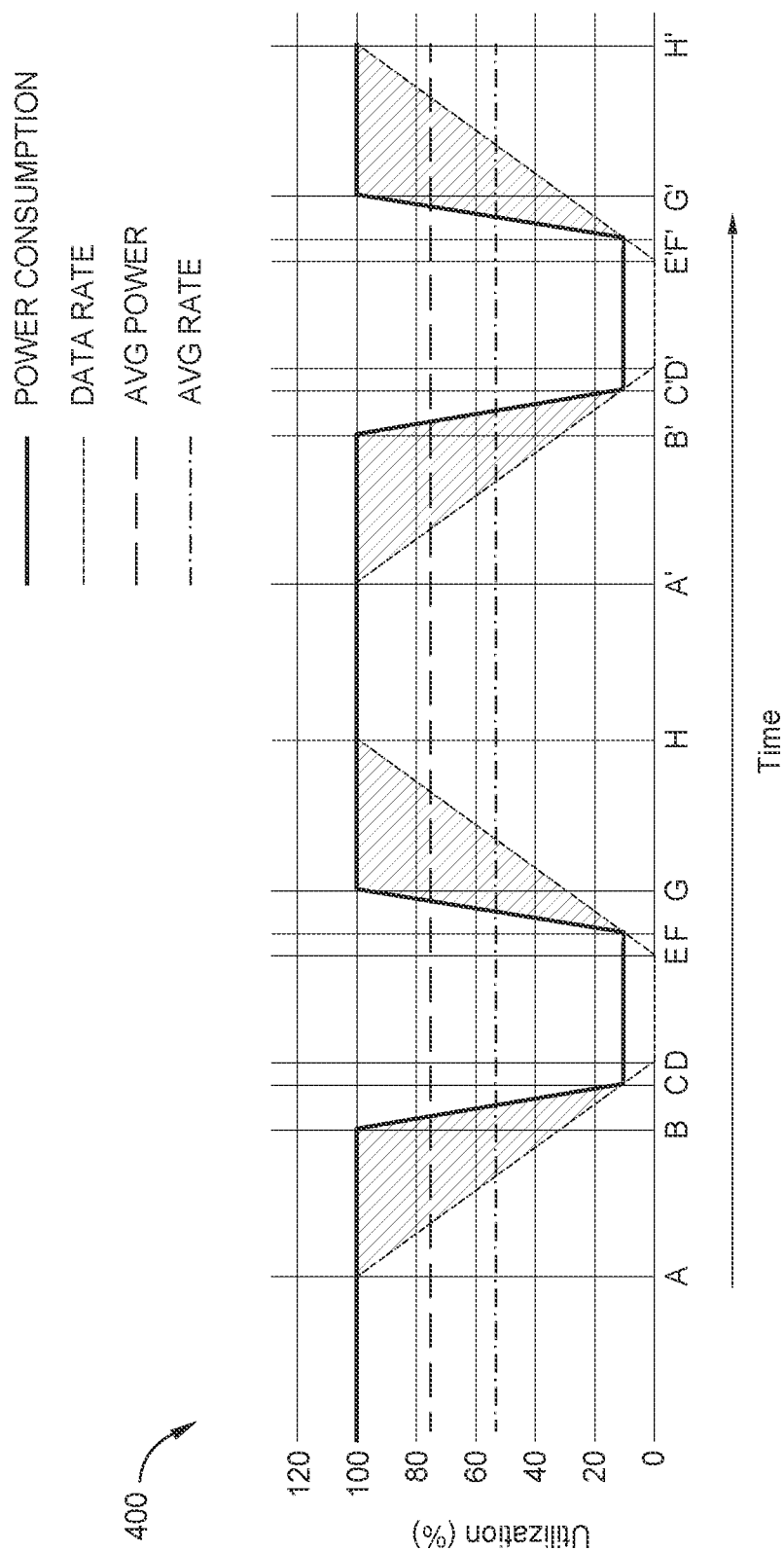
FIG. 4 is an example diagram of a power duty cycle and related execution of commands and data rate, according to prior approaches.

In FIG. 3, the storage device is initially at about 100% power consumption or at full operational power. At time A and time C, the storage device enters the deep sleep mode (e.g., goes to sleep) and the power consumption decreases to about 10% power consumption. However, the power consumption decrease to about 10% power consumption does not occur instantaneously. From time A to time A' and from time C to time C', the gradual decrease in power consumption is referred to as a tail. For optimal performance, the power consumption tail should be as little as possible as the power consumption tail adds to the AON power consumption. Also, when the storage device is woken up from the deep sleep mode at time B and time D, the storage device does not return to full operational power until time B' and time D', respectively FIG. 4 is an example diagram of a power duty cycle and related execution of commands and data rate, according to prior approaches. Aspects of FIG. 3 may be similar to the description of FIG. 4. Time is graphed on the x-axis and the utilization percent is graphed on the y-axis. For example, the utilization percent of the power consumption is 100% power consumption from time A to time B and the utilization percent of the data rate (data transfer rate) is 100% data rate from time A to time B. The power state PS1 may correspond with a power consumption of about 100% and the power state PS4 may correspond with a power consumption of about 10%. The deep sleep mode may refer to the power state PS4. The power consumption curve is graphed as a solid line. The data rate curve is graphed as a dotted line. The average power curve is graphed as a dashed line. The average rate curve is graphed as a dashed-dotted line. The average power remains constant at about 75% power consumption and the average data rate remains constant at about 50% data transfer rate through the power duty cycle.

At time A and time A', the data transfer rate begins to decrease to prepare for the storage device to enter a deep sleep mode. However, the power consumption of the storage device remains constant from time A to time B and from time A' to time B'. Between the time A to time B and the time A' to time B', the storage device is completing the previously fetched commands (e.g., commands remaining in the queue or buffer) and remains in the full operational power state, PS1. During this time, no additional commands are being fetched, and no additional data is being transferred outside of that needed for the completion of the previously fetched commands, according to prior approaches.

At time B and time B', the storage device has completed the remaining commands in the command queue or the command buffer. At time B to time C and at time B' to time C', the power consumption of the device gradually decreases from about 100% power consumption to about 10% power consumption. At time C and time C', the storage device enters the deep sleep mode. The area between the power consumption curve and the data rate curve between the time B to time C and between the time B' to time C' correspond to extra power consumption by the storage device due to the power consumption tails.

At time E and time E', the data rate begins to increase from about 0% data rate until it reaches about 100% data rate at time H and time H'. Because the storage device is in the deep sleep mode, the storage device has a lag or latency before supplying more power to the relevant components, such as the memory devices 206A-206N, to return to the power state PS1. The power consumption lag is indicated by the time between time E to time F and between time E' to time F'.

At time G and G', the storage returns to full operational power or about 100% power consumption. However, the storage device does not have about 100% data rate until time H and time H', indicating that the command buffer or queue is not yet optimally filled. Like the power consumption tail described in the powering down process above, the area between the power consumption curve and the data rate curve between the time F to time H and between the time F' to time H' correspond to extra power consumption by the storage device due an over-appropriation of resources for a less than optimal number of commands in the queue or buffer, during which time the empty command queue is being filled by fetching commands from the host, and initiating those commands.

FIG. 5A is a flow diagram for a method 500 for power cycle command optimization, according to disclosed embodiments. At block 502, the controller, such as the controller 108 of FIG. 1, receives a first command from the host, such as the host 104 of FIG. 1. The controller calculates the expected/estimated NAND time, LDPC time, and HIM time for the command received from the host at block 504. The results of the calculations from block 504 are stored in the RAM3 (AON) at block 506. At block 508, the controller waits to receive another command from the host. When the controller receives another command, such as a second command, from the host, the method 500 begins at block 502.

FIG. 5B is a flow diagram for a method 550 for power cycle command optimization, according to disclosed embodiments. After the controller has completed method 500 for a command, such as a first command, the controller starts processing the first command at block 552. The storage device, such as the storage device 208 of FIG. 2, may be operating under a power duty cycle mode. At block 554, the controller checks the time until the next power cycle (e.g., going from P1 to P4). At block 556, the controller checks the NAND, LDPC, and HIM current task load so that the controller recognizes which commands in the current task load can be completed before the next power cycle.

At block 558, the controller calculates the time remaining for the current NAND, LDPC, and HIM operations in the current task load. At block 560, the first command is selected from the RAM3 (AON). Based on the calculations completed at block 558, the controller determines if the first command selected at block 560 can be completed in the time remaining until the next power cycle at block 562. If the controller is not able to complete the selected command in the time remaining, the controller selects another command from the RAM3 (AON) at block 560. However, if the controller is able to complete the first command in the time remaining before the next power cycle at block 562, the controller generates instructions for data path engines at block 564.

The controller updates the current NAND, LDPC, and HIM loads at block 566. The updated loads at block 566 are utilized at block 558 to calculate the next iteration of time remaining for NAND, LDPC, and HIM operations of the method 550. At block 568, the data path engines finish the instructions for the command generated by the controller at block 564. The controller updates the current NAND, LDPC, and HIM loads at block 570. The updated loads at block 570 are utilized at block 558 to calculate the next iteration of time remaining for NAND, LDPC, and HIM operations of the method 550. After completing the update of the current NAND, LDPC, and HIM loads at block 570, the controller services the next command in the command queue or the command buffer at block 572.

Figure 6:
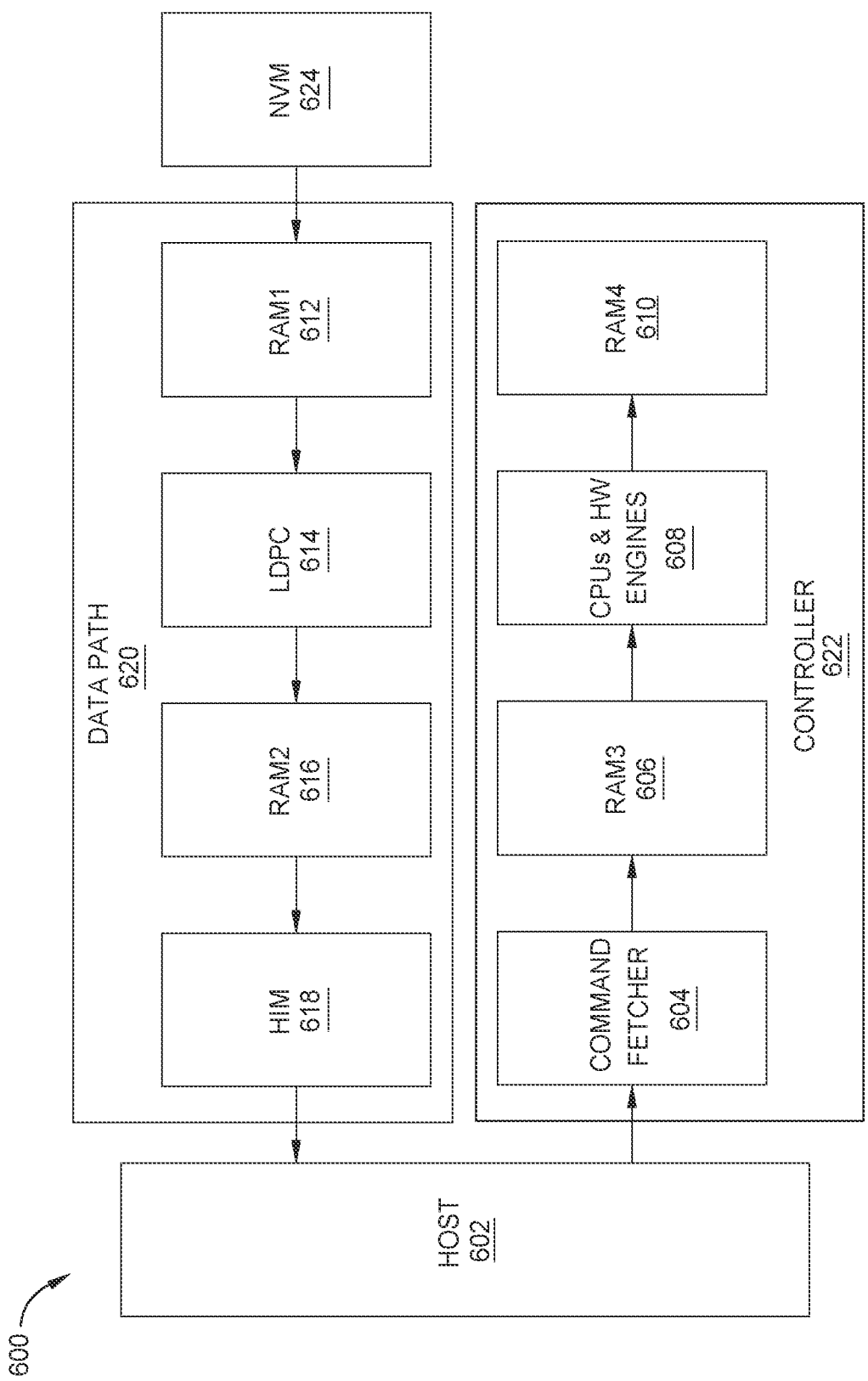
FIG. 6 is a data and control path for power cycle optimization, according to disclosed embodiments.

FIG. 6 depicts a data and control path for power cycle optimization 600, according to disclosed embodiments. The data and control path illustrated describes an embodiment of how a read command is performed or a write command is performed. The described data and control path for power cycle optimization described herein is not intended to be limiting, but to provide an example of a possible embodiment.

The host 602 sends a command to the data storage device, such as the data storage device 208 of FIG. 2, to access data stored in the NVM 624. The command fetcher 604 of the controller 622 receives the command sent by the host 602. The CPUs and the hardware (HW) engines 608 of the data storage device splits the command received by the command fetcher 604 into smaller actions for the different data paths (e.g., LDPC, HIM, XOR, etc.). The smaller actions are stored in the RAM4 610.

When the command to access data from the NVM 624 is received by the controller 622, the relevant data is moved through the data path 620 from the NVM 624 to the RAM1 612. The data passes through the LDPC 614 to the RAM2 616. From the RAM2 616, the data is moved to the HIM 618, where the HIM 618 moves the data to the host 602.

During the deep sleep mode, the data stored in RAM1 612, RAM2 616, and RAM4 610 is lost. Though RAM3 606 may be smaller than RAM1 612, RAM2 616, and RAM4 610, in one embodiment, RAM3 606 is the dedicated AON RAM and is able to hold commands when the storage enters the deep sleep mode. Because the RAM3 606 is the AON RAM, the CPU and the HW engines 608 can select to process commands that can be completed in the time remaining before the next power cycle occurs, where the storage device enters the deep sleep mode.

Figure 7:
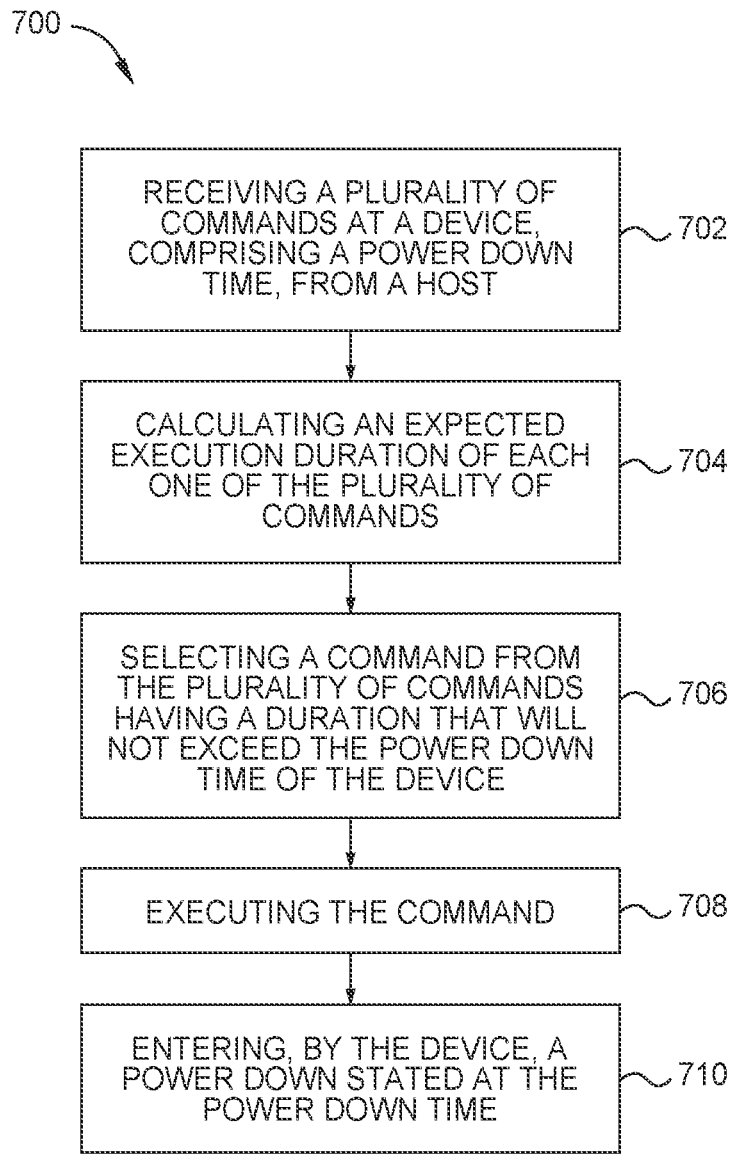
FIG. 7 depicts a method for power cycle optimization using command execution, according to disclosed embodiments.

FIG. 7 depicts a method 700 for power cycle optimization using command execution, according to disclosed embodiments. At block 702, the storage device, such as the storage device 208 of FIG. 2, receives a plurality of commands from the host, such as the host 602 of FIG. 6. The storage device operates under a power cycle mode, where the storage device has a power down time. The power down time refers to when the power consumption of the device begins to decrease, which may be later in time than when the data rate begins to decrease. At block 704, the controller, such as the controller 622 of FIG. 6, calculates the expected execution duration of each one of the plurality of commands stored in the command queue or the command buffer.

At block 706, the controller selects one or more commands from the plurality of commands that can be completed within the time remaining before the storage device powers down. Each of the one or more commands selected are executed at block 708. At block 710, the storage device begins to power down to the deep sleep mode at the power down time. In one embodiment, the power down time may be predetermined, where the power down time is at identical intervals. In another embodiment, the power down time may be a set time after a cue from the storage device or the host device. The remaining commands in the command queue or the command buffer that have not been executed are stored in the AON RAM, such as the RAM3 606 of FIG. 6. The remaining commands may be executed when the data storage device wakes up from the deep sleep mode. In some embodiments, some commands are partially executed, with the un-executed portions being stored in the AON RAM until exit of deep sleep mode.

Figure 8:
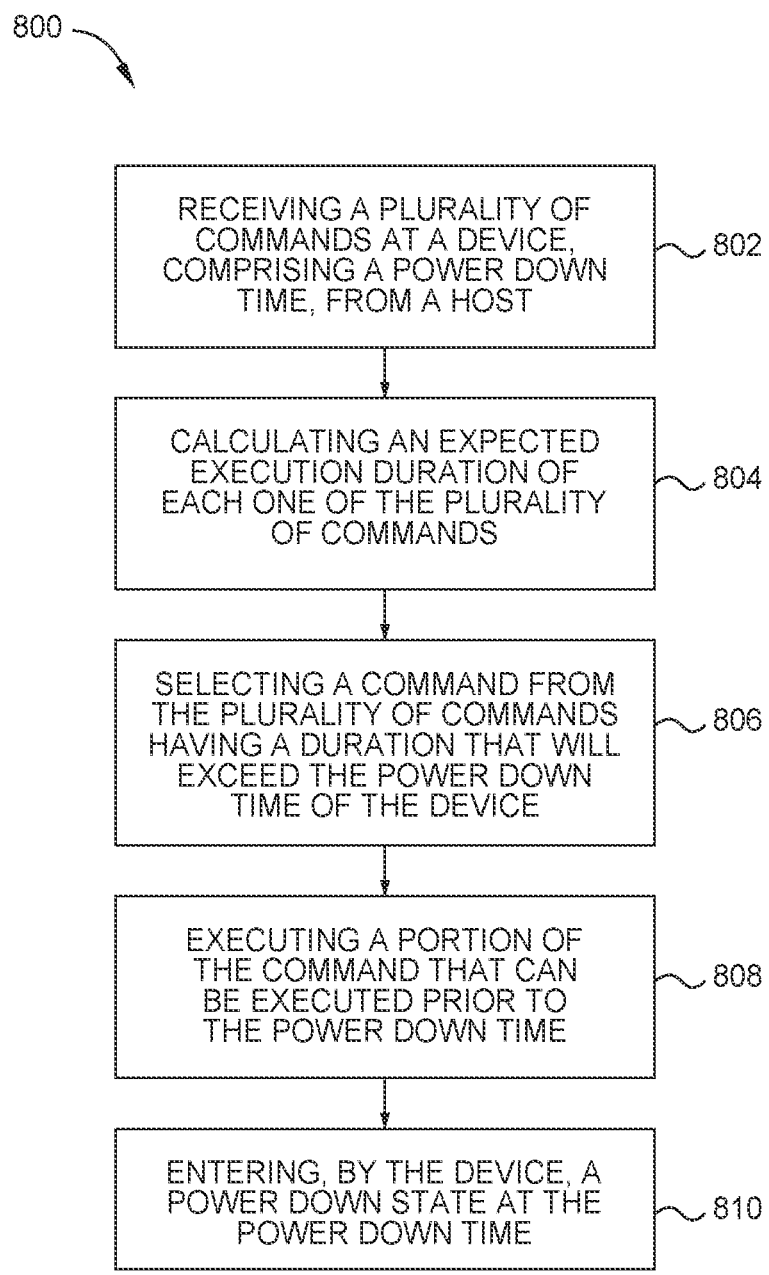
FIG. 8 depicts a method for power cycle optimization using partial command execution, according to disclosed embodiments.

FIG. 8 depicts a method 800 for power cycle optimization using partial command execution, according to disclosed embodiments. At block 802, the storage device, such as the storage device 208 of FIG. 2, receives a plurality of commands from the host, such as the host 602 of FIG. 6. The storage device operates under a power cycle mode, where the storage device has a power down time. The power down time refers to when the power consumption of the device begins to decrease, which may be later in time than when the data rate begins to decrease. At block 804, the controller, such as the controller 622 of FIG. 6, calculates the expected execution duration of each one of the plurality of commands stored in the command queue or the command buffer.

At block 806, the controller selects one or more commands from the plurality of commands that will not be completed within the time remaining before the storage device powers down. Each of the one or more commands selected are executed at block 808. However, since the one or more commands selected cannot be completed prior to the power down time, the controller 622 executes a portion of the one or more commands. The remainder of the one or more commands not yet completed and the one or more commands not yet executed are stored in the AON RAM, such as the RAM3 606 of FIG. 6. At block 810, the storage device begins to power down to the deep sleep mode at the power down time. In one embodiment, the power down time may be predetermined, where the power down time is at identical intervals. In another embodiment, the power down time may be a set time after a cue from the storage device or the host device. The commands stored in the AON RAM may be executed when the storage device returns to a fully operational mode from the deep sleep mode.

Figure 9:
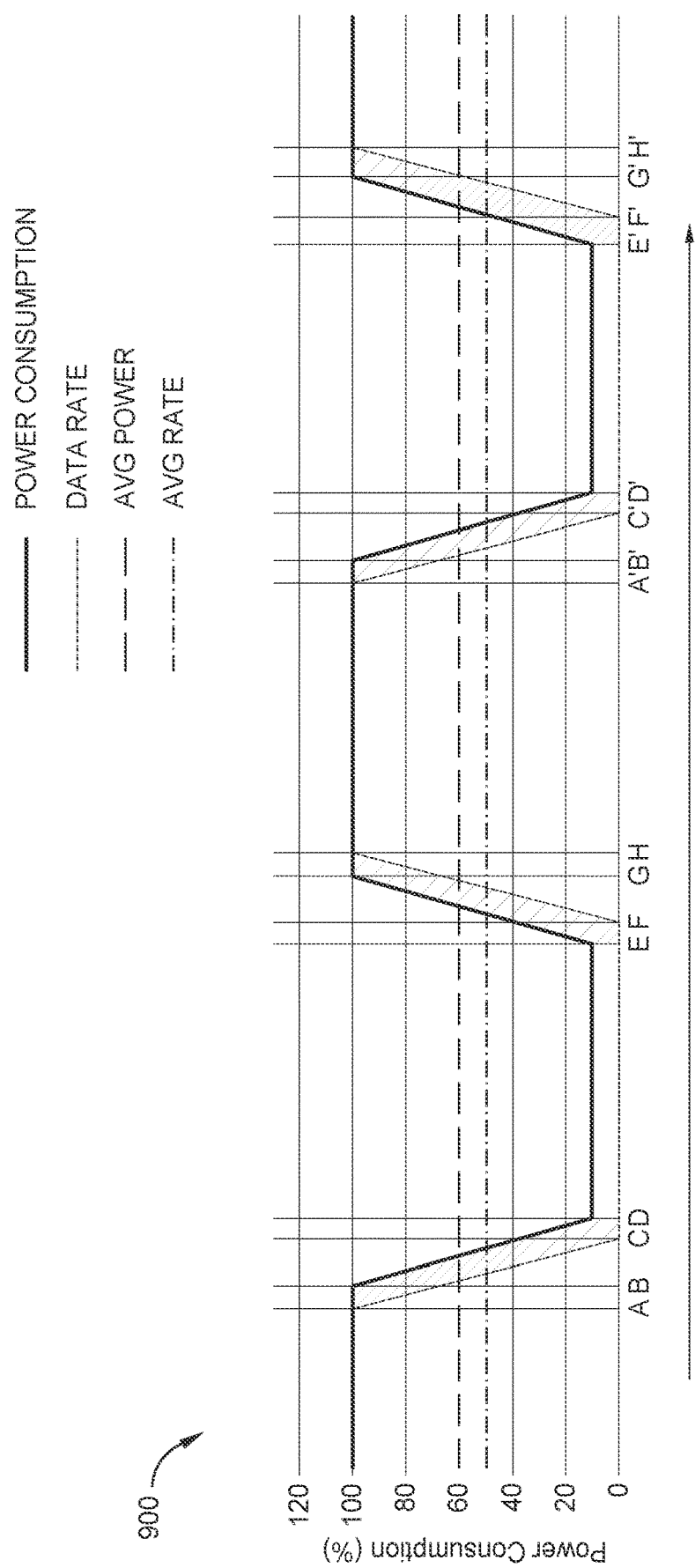
FIG. 9 is an example diagram of a power duty cycle and related execution of commands and data rate, according to disclosed embodiments.

FIG. 9 is an example diagram of a power duty cycle and related execution of commands and data rate 900, according to disclosed embodiments. Aspects of FIG. 3 and FIG. 4 may be similar to the description of FIG. 4. Time is graphed on the x-axis and the utilization percent is graphed on the y-axis. For example, the utilization percent of the power consumption is 100% power consumption from time A to time B and the utilization percent of the data rate (data transfer rate) is 100% data rate from time A to time B. The power state PS1 may correspond with a power consumption of about 100% and the power state PS4 may correspond with a power consumption of about 10%. The deep sleep mode may refer to the power state PS4. The power consumption curve is graphed as a solid line. The data rate curve is graphed as a dotted line. The average power curve is graphed as a dashed line. The average rate curve is graphed as a dashed-dotted line. The average power remains constant at about 60% power consumption and the average data rate remains constant at about 50% data transfer rate through the power duty cycle.

At time A and time A', the data transfer rate begins to decrease to prepare for the storage device to enter a deep sleep mode. However, the power consumption of the storage device remains constant from time A to time B and from time A' to time B'. Between the time A to time C and the time A' to time C', the storage device is completing the previously fetched commands (e.g., commands remaining in the queue or buffer) according to the methods 500, 550 described FIG. 5, the method 700 described in FIG. 7, and/or the method 800 described in FIG. 8. In some embodiments, one or more commands are partially completed, with the uncompleted portions stored in the AON RAM. Because the controller, such as the controller 622 of FIG. 6, is selecting commands based on the method 700 described in FIG. 7 and/or the method 800 described in FIG. 8, the storage device is able to power down more quickly and is able to complete selected commands while the storage device is powering down. The time between time A to time B and the time from time A' to time B' of FIG. 9 is significantly less than the time between time A to time B and the time from time A' to time B' of FIG. 4.

Figure 5:
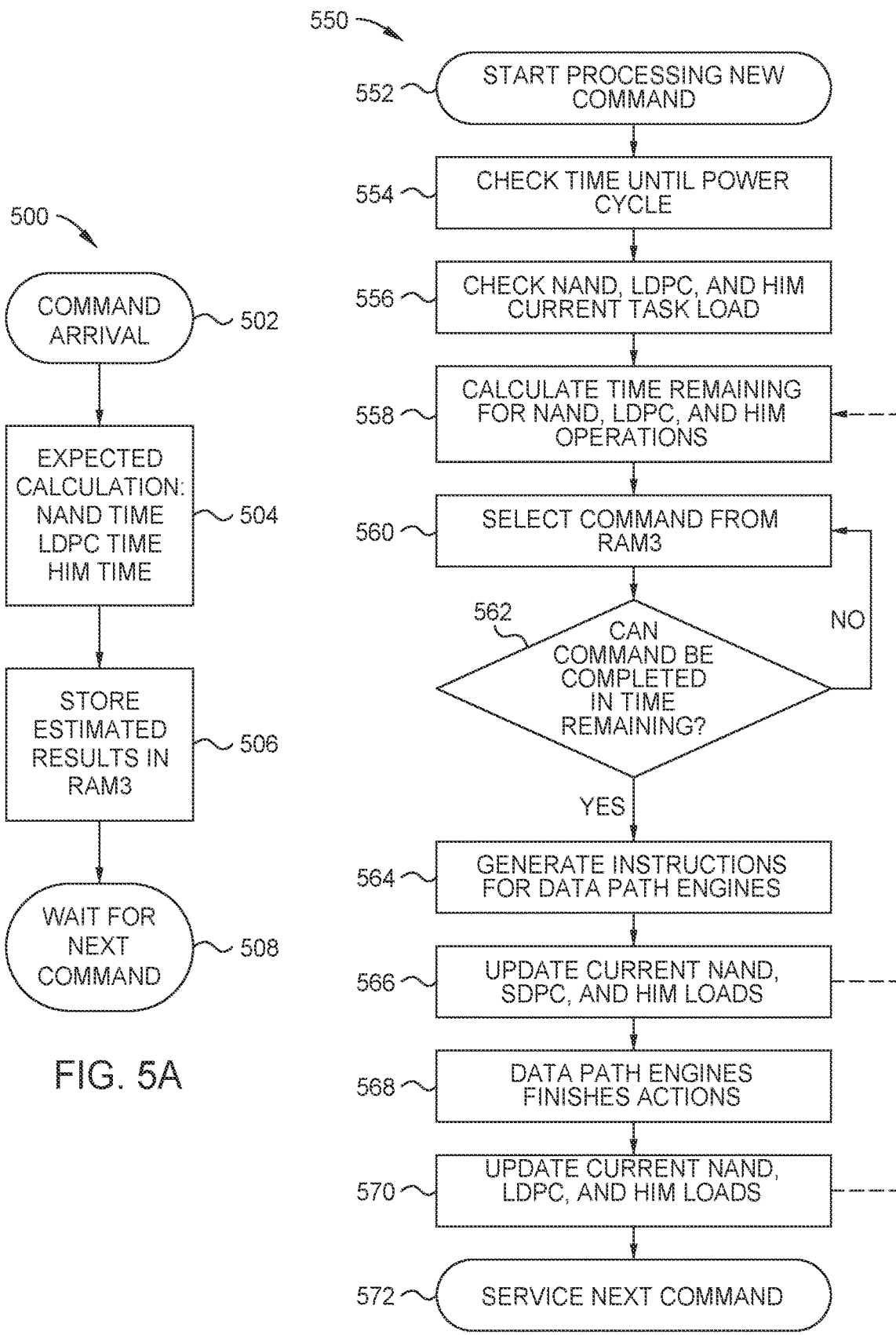
FIG. 5A-5B are flow diagrams for power cycle command optimization, according to disclosed embodiments.

At time C and time C', the storage device has completed the remaining commands in the command queue or the command buffer according to the methods 500, 550 described FIG. 5, the method 700 described in FIG. 7, and/or the method 800 described in FIG. 8. The remaining commands not yet executed or not un-executed portions of commands not fully completed are stored in the AON RAM, such as the RAM3 606 of FIG. 6. For example, as the storage device is powering down, the controller may fetch a first command that can be fully executed and a second command that can partially be completed before the power down time. The portion of the second command that has not yet been completed before the power down time and any other remaining commands are stored in the AON RAM. At time B to time D and at time B' to time D', the power consumption of the device gradually decreases from about 100% power consumption to about 10% power consumption. At time D and time D', the storage device enters the deep sleep mode.

At time E and time E', the power consumption rate of the storage device increases, indicating that the device is returning to a fully operational state from the deep sleep mode. At time F and time F', the data rate begins to increase from about 0% data rate until it reaches about 100% data rate at time H and time H'. At time G and G', the storage returns to full operational power or about 100% power consumption. Because the AON RAM includes commands not yet completed or not yet executed prior to the previous storage device power down, the controller is able to service those commands as the power consumption of the storage device increases, without the need to fetch commands from a host. For example, the previous second command portion, stored in the AON RAM that has not yet been completed before the storage device went into a deep sleep mode, is executed as the storage device wakes up from the deep sleep mode. The controller may fetch a third command from the remaining commands not yet executed, to be serviced as the storage device is returning to a fully operational mode. In some embodiments, additional commands may be fetched from a host while the commands, and partially executed commands, from the AON RAM are being executed.

By selecting either partial commands or full commands to complete in the time remaining before the storage device goes into the deep sleep mode, the power consumption tail of the storage device is decreased, enabling storage devices resources to be fully utilized during power up, instead of waiting for commands to be fetched from a host as in prior approaches. Furthermore, when the storage device wakes up from the deep sleep mode, the not yet completed or not yet executed commands stored in the AON RAM can be serviced while the storage device is returning to a fully operational mode. Thus, the storage device, while operating in a power cycle mode, is able to have a performance to power ratio better than prior approaches, such as depicted in FIG. 4.

In one embodiment, a data storage device includes one or more memory devices and a controller coupled to the one or more memory devices. The controller is configured to receive a plurality of commands at the data storage device that includes a power down time, from a host. The controller is also configured to calculate an expected execution duration of each one of the plurality of commands, select a command from the plurality of commands having a duration that will not exceed the power down time, execute the command, and cause to enter, by the data storage device, a power down state at the power down time.

The command is a member of a subset of the plurality of commands, for which aggregate expected durations of each command of the subset will not exceed the power down time. The controller is further configured to update the power down time of the device after executing the command based on the duration of the execution of the command. The controller is further configured to select a second command from the plurality of commands having a duration that will not exceed the updated power down time. The controller is also configured to update the power down time of the device based on the duration of the execution of the second command. The controller is further configured to select a second command from the plurality of commands having a duration that will exceed the updated power down time. The controller is further configured to execute a portion of the second command. The controller is further configured to store an un-executed portion of the second command. The controller is further configured to power up the data storage device at a power up time, and further configured to fetching the un-executed portion of the second command at the power up time and executing the un-executed portion of the second command. The controller is also configured to fetch a third command from the host during execution of the un-executed portion of the second command.

In another embodiment, a data storage device includes one or more memory devices and a controller coupled to the one or more memory devices. The controller is configured to receive a plurality of commands at a device comprising a power down time and a power up time, from a host. The controller is also configured to calculate an expected execution duration of each one of the plurality of commands, select a command from the plurality of commands having a duration that will exceed the power down time of the device, execute a portion of the command that can be executed prior to the power down time, and enter, by the device, a power down state at the power down time.

The controller is further configured to store an un-executed portion of the command prior to the power down time. The controller is also configured to enter, by the device, a power up state at the power up time, fetch the un-executed portion of the command, and execute the un-executed portion of the command. The controller is further configured to fetch an additional command from the host during one of the fetching of the un-executed portion of the command, and execution of the un-executed portion of the command.

In another embodiment, a system for controlling power consumption of a device is disclosed, the system including a means for receiving a command at a device, from a host, a means for calculating the duration of the command, and a means for determining a power down time of the device. The system further includes a means for selecting the command, a means for determining if the duration of the command will exceed the power down time, and a means for executing the command. The system may further include a means for updating the power down time of the device, based on the duration of the command, and a means for putting the device in a power down state based on the power down time.

The system further includes a means for recalculating the power down time, based on the duration of the command, thereby generating a recalculated power down time. The means for receiving the command receives a second command at the device. The system further includes a means for determining that a second duration of the second command will exceed the recalculated power down time. The system also includes a means for executing a portion of the second command that at will not exceed the power down time. The system further includes a means for storing an un-executed portion of the second command, and executing the unexecuted portion of the second command at a power up time of the device.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   one or more memory devices; and
   a controller coupled to the one or more memory devices, wherein the controller is configured to:
      receive a plurality of commands at the data storage device comprising a power down time, from a host;
      calculate an expected execution duration of each one of the plurality of commands;
      select a command from the plurality of commands having an expected duration that will exceed the power down time;
      execute a portion of the command;
      save un-executed portions of the command in the memory device;
      cause the data storage device to enter a power down state;
      cause the data storage device to enter a power on state;
      retrieve the un-executed portions of the saved command; and
      execute the un-executed portions of the retrieved command.

2. The data storage device of claim 1, wherein the controller is further configured to update a power down time of the device based on a duration of the execution of the command.

3. The data storage device of claim 2, wherein the controller is further configured to select a second command having a duration that will exceed the updated power down time.

4. The data storage device of claim 3, wherein the controller is further configured to execute a portion of the second command.

5. The data storage device of claim 4, wherein the controller is further configured to store an un-executed portion of the second command.

6. The data storage device of claim 5, wherein the controller is further configured to power up the data storage device at a power up time, and further configured to fetch the un-executed portion of the second command at the power up time and execute the un-executed portion of the second command.

7. The data storage device of claim 6, wherein the controller is further configured to fetch a third command from the host during execution of the un-executed portion of the second command.

8. A data storage device, comprising:
one or more memory devices; and
a controller coupled to the one or more memory devices, the controller configured to:
receive a plurality of commands at a device comprising a power down time and a power up time, from a host;
calculate an expected execution duration of each one of the plurality of commands;
select a command from the plurality of commands having a duration that will not exceed the power down time of the device;
execute the command prior to the power down time;
select a second command from the plurality of commands having an expected duration that will exceed the power down time of the device;
execute a portion of the second command;
store un-executed portions of the second command in memory;
enter, by the device, a power down state at the power down time;
enter a power on state;
retrieve the un-executed portions of the second command; and
execute the un-executed portions of the second command.

9. The data storage device of claim 8, wherein the controller is further configured to store an un-executed portion of a third command prior to the power down time.

10. The data storage device of claim 9, wherein the controller is further configured to:
enter, by the device, a power up state at the power up time;
fetch the un-executed portion of the third command; and
execute the un-executed portion of the third command.

11. The data storage device of claim 10, wherein the controller is further configured to fetch a fourth command from the host during one of the fetching of the un-executed portion of the second command, and execution of the un-executed portion of the second command.

12. A data storage device, comprising:
memory means; and
a controller coupled to the memory means, wherein the controller is configured to:
receive first commands that can be executed prior to a power down time;
receive second commands that cannot be executed prior to a power down time;
execute the first commands prior to entering a power down state;
execute portions of the second commands prior to entering the power down state;
store un-executed portions of the second commands in a memory device disposed in the controller prior to entering the power down state; and
execute the un-executed portions of the second commands after entering a power up state, wherein the executing the un-executed portions of the second commands occurs after storing the un-executed portions of the second commands in the memory device.

13. The data storage device of claim 12, wherein the controller is configured to calculate whether the second commands can be completed prior to entering the power down state.

14. The data storage device of claim 12, wherein the controller is configured to check the memory means current task load.

15. The data storage device of claim 12, wherein the memory device is volatile memory.

16. The data storage device of claim 12, wherein the memory device is always on memory.

17. The data storage device of claim 12, wherein the controller is configured to determine an expected duration of the first commands and the second commands.

18. The data storage device of claim 12, wherein the controller is configured to execute portions of third commands prior to entering the power down state.

19. The data storage device of claim 18, wherein the controller is configured to store unexecuted portions of the third commands to the memory device prior to entering the power down state.

* * * * *